United States Patent [19]

Adrian

[11] 4,006,857
[45] Feb. 8, 1977

[54] METHOD FOR TRANSPORTATION AND UTILIZATION OF WASTE HEAT OF LARGE CONDENSER POWER PLANTS

[75] Inventor: Fritz Adrian, Ratingen, Germany

[73] Assignee: Deutsche Babcock & Wilcox Aktiengesellschaft, Oberhausen, Germany

[22] Filed: Sept. 2, 1975

[21] Appl. No.: 609,400

[30] Foreign Application Priority Data

Dec. 21, 1974 Germany .......................... 2460829

[52] U.S. Cl. .................................. 237/2 B; 237/13; 62/238; 60/648
[51] Int. Cl.² ...................... F24D 9/00; F24D 11/02
[58] Field of Search ....................... 62/238; 60/648; 237/2 B, 13

[56] References Cited

UNITED STATES PATENTS

| | | | |
|---|---|---|---|
| 1,969,187 | 8/1934 | Schutt | 237/1 A |
| 2,396,338 | 3/1946 | Newton | 237/1 A |
| 2,553,302 | 5/1951 | Cornwall | 237/1 A |
| 2,575,478 | 11/1951 | Wilson | 237/1 A |
| 2,751,761 | 6/1956 | Borgerd | 62/238 |
| 3,838,813 | 10/1974 | Brosenius | 237/13 |
| 3,871,180 | 3/1975 | Swanson | 60/648 |
| 3,890,787 | 6/1975 | Margen | 237/13 |

*Primary Examiner*—William E. Wayner
*Assistant Examiner*—Henry C. Yuen
*Attorney, Agent, or Firm*—Max Fogiel

[57] ABSTRACT

A method for transporting heat over long distances in which waste heat from large power plants is utilized. The condenser back-pressure is increased to a level so that the condenser cooling water acquires a temperature in the range of 25°–50° C. The cooling water is subsequently pumped through large pipelines to heat consumer centers where it serves as a heat source for heat pumps. The heat content of the condenser cooling the water is used for raising the temperature of a heating medium to such a degree, that the heat content can be used for heating purposes. After giving off the heat, the condenser cooling water may be used for cooking or drinking purposes, or for the dilution and cooling of waste water.

6 Claims, 1 Drawing Figure

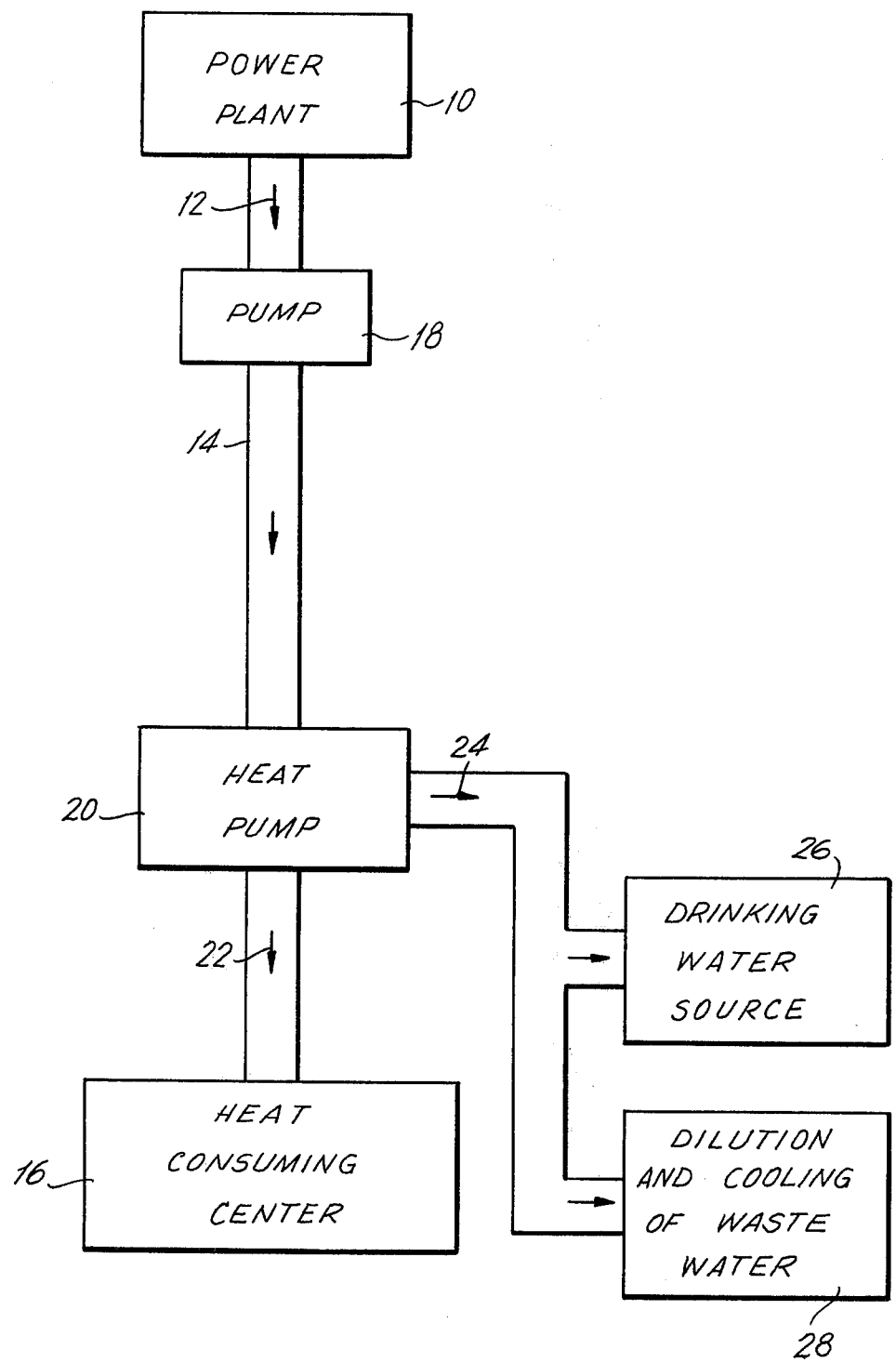

METHOD FOR TRANSPORTATION AND UTILIZATION OF WASTE HEAT OF LARGE CONDENSER POWER PLANTS

BACKGROUND OF THE INVENTION

The present invention relates to a procedure for utilizing the waste heat of large condenser power plants and to the transfer of these quantities of heat.

For national, economic and technical reasons it is necessary to utilize the waste heat occurring in power plants to a greater extent than has been done in the past.

It is already known in the art how to operate thermal power stations with increased back-pressure and to conduct the waste heat in the form of steam to the heat consumers. It is also known how to generate hot water by means of the waste heat of the back-pressure turbines or with bleeder steam of pass-out condensing turbines and to conduct and to distribute heat in this form to the consumers and thus use it for heating purposes. These known procedures have the disadvantage of having to operate with relatively high temperature differences between heating medium and the ambient zone, so that when bridging large distances, considerable efforts must be made for the insulation of the transport lines to prevent too much heat from getting lost to the surrounding area. For this reason, up to the present, thermal power plants or stations are erected as close as possible to the centers of the consumption. As a result, location advantages outside of urban centers cannot be utilized. In particular, it is not possible to establish such thermal power plants in the vicinity of fuel dumps or favorable locations for the obtaining of electrical energy or cooling water supply.

Another disadvantage is that because of the disproportion between waste heat quantity and the necessary electric power generation, the possible unit size of thermal power plants is extremely restricted. This fact leads to considerable economic disadvantages from the viewpoint of investments.

It is, therefore, an object of the present invention to transfer or transport the waste heat of condenser power plants from locations favorable to the construction of power plants to urban centers where heat is in demand. The heat transfer will be accomplished economically with minimum heat losses and at minimum cost.

Another object of the present invention is to provide a method for transporting waste heat of condenser power plants over substantially long distances without requiring complex equipment or installations.

A further object of present invention is to provide a method, as described, in which substantially low maintenance costs are involved and which have a long life in service.

SUMMARY OF THE INVENTION

The objects of the present invention are achieved by providing that the condenser back-pressure in the power plant is increased only slightly to such an extent, that the condenser cooling water acquires a temperature in the range of 25°-50° C. The cooling water is then pumped through large pipelines to heat consumer centers where it serves as a heat source for heat pumps, with the provision that its heat content is used for raising the temperature of a heating medium to such a degree, that the heat can be utilized for heating purposes.

After giving off the heat, the condenser cooling water may be used as cooking or drinking water, for example. At the same time, the condenser cooling water, after giving off heat, may be used for the dilution and cooling of waste water.

The pipelines carrying the condenser cooling water toward the urban areas, may be located beneath the surface of streets or highways for the purpose of preventing the accumulation of snow or ice.

The novel features which are considered as characteristic for the invention are set forth in particular in the appended claims. The invention itself, however, both as to its construction and its method of operation together with additional objects and advantages thereof will be best understood from the following description of specific embodiments when read in connection with the accompanying drawings.

BRIEF DESCRIPTION OF THE DRAWINGS

A process flow diagram showing the method steps, in accordance with the present invention.

DESCRIPTION OF THE PREFERRED EMBODIMENTS

In accordance with the present invention, the back-pressure of the condensing reheat turbine in a power plant 10 is increased only slightly so that the condensation cooling water 12 is about 25°-50° C and is subsequently pumped via large pipelines 14 to centers of heat consumption 16, by pump means 18. At these consumer centers, the warm cooling water is used as heating source for heat pumps 20 in which the temperature of a heating medium 22 is raised so that it can be used for heating purposes.

In accordance with an additional expedient measure of the present invention, the water 24, after giving off heat, is used as cooking or drinking water 26. In accordance with the present invention it is also possible to utilize the water after giving off the heat for the dilution and cooling of waste water 28.

Another characteristic of the method in accordance with the present invention is that the large pipelines carrying the water be located underneath the surface of streets or throughways in such a way that the small heat loss of these pipelines is sufficient to keep the roadway during the winter free from snow and ice. In addition, a favorable influence on fog formation above the roadways during inclement weather is also to be expected.

If, in accordance with an additional feature or improvement of the present invention, the large pipelines are used simultaneously as compensating storage chambers, the electrical output of the turbo-generator can be regulated by varying the condenser pressure. In this manner, the output can be raised during peak load times for brief periods in a manner already known to the art without detracting from the heat offered at the end of the pipeline system.

The method in accordance with the present invention offers the advantage that by the combination of already known devices, the heat of cooling water from condenser power plants is made available in large quantities, for heating purposes. This water can be delivered over long distances via large pipelines at relatively low temperatures without requiring large expenditures for insulation, because of the small temperature differences relative to the ambient surroundings, as was necessary up to the present for steam and hot-water lines. In the consumer centers, the temperature level of a heating medium can be raised with the known heat pumps by means of the supplied water to such an extent, that the heat from the cooling water of far removed or remotely located power plants can be used. The electrical energy necessary for operating the heat pumps, which according to present knowledge is about 20 to 25% of the possible heating power, is transmitted via the present high-voltage lines from the power plant to the consumer locations.

During times of peak requirement of electrical energy, the transfer or transport system can be used as compensating storage chambers in favor of the electrical energy generation. For this purpose, the condenser pressure must be lowered so that the ratio of generated electrical energy to the waste heat of the power plant changes in favor of the energy generation (becomes larger). The briefly reduced quantity of waste heat can be compensated by the large volume of the pipeline system, or by means of the length of the pipeline system, care must be taken that the lower heat yield arrives during times of lower heat requirements at the consumer centers.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A method for transporting heat over long distances, utilizing the waste heat of thermal power plants comprising the steps of: increasing the condenser backpressure at a power plant to a level at which the condenser cooling water attains a temperature within the range of 25°–50° C; the temperature of said cooling water being limited within the range of 25°–50° C; pumping the cooling water through substantially large pipelines to a location remote and at a substantially far distance from said power plant for using the heat in the cooling water for consumer purposes; the temperature of said cooling water being limited within the range of 25°–50° C for substantially minimizing loss of heat from said pipelines while said cooling water is pumped through said pipelines; applying the condenser water to a heat pump and raising the temperature of a heating medium by the heat content in said condenser water, the temperature of said heating medium being raised to a level at which the heat transferred from the condenser water to the heating medium is usable for heating purposes at said location.

2. The method as defined in claim 1 including the step of transferring the condenser water to a source of drinking water after giving off heat to said heating medium.

3. The method as defined in claim 1 including the step of diluting and cooling waste water with the condenser water.

4. The method as defined in claim 1 including the step of placing said large pipelines beneath the surfaces of streets and highways.

5. The method as defined in claim 1 including the steps of lowering the condenser pressure and the condenser cooling water temperature during times of peak requirement of energy at said location; and arranging said large pipelines as heat compensation storage chambers.

6. The method as defined in claim 1 including the step of placing said large pipelines beneath the surfaces of streets and highways; lowering the condenser pressure and the condenser cooling water temperature during times of peak requirement of energy at said location; arranging said large pipelines as heat compensation storage chambers; and diluting and cooling waste water with said condenser water.

* * * * *